US012650321B2

(12) United States Patent
Lerchenmueller et al.

(10) Patent No.: US 12,650,321 B2
(45) Date of Patent: Jun. 9, 2026

(54) SENSOR DEVICE FOR DETECTING A ROTATIONAL POSITION OF A ROTOR OF AN ELECTRIC MACHINE, DRIVE DEVICE, PRESSURE GENERATOR FOR A BRAKE SYSTEM

(71) Applicant: Robert Bosch GmbH, Stuttgart (DE)

(72) Inventors: Klaus Lerchenmueller, Rettenberg (DE); Lothar Detels, Burgberg (DE); Konstantin Haberkorn, Stuttgart (DE); Wolfgang Sinz, Oberreute (DE)

(73) Assignee: ROBERT BOSCH GMBH, Stuttgart (DE)

( * ) Notice: Subject to any disclaimer, the term of this patent is extended or adjusted under 35 U.S.C. 154(b) by 67 days.

(21) Appl. No.: 18/558,879

(22) PCT Filed: Aug. 8, 2022

(86) PCT No.: PCT/EP2022/072217
§ 371 (c)(1),
(2) Date: Nov. 3, 2023

(87) PCT Pub. No.: WO2023/020871
PCT Pub. Date: Feb. 23, 2023

(65) Prior Publication Data
US 2024/0240970 A1      Jul. 18, 2024

(30) Foreign Application Priority Data
Aug. 19, 2021      (DE) ..................... 10 2021 209 105.9

(51) Int. Cl.
*G01D 5/20* (2006.01)
*B60T 13/74* (2006.01)
(Continued)

(52) U.S. Cl.
CPC .......... *G01D 5/2053* (2013.01); *B60T 13/745* (2013.01); *B60T 17/22* (2013.01); *H02K 11/21* (2016.01)

(58) Field of Classification Search
None
See application file for complete search history.

(56) References Cited

U.S. PATENT DOCUMENTS 5,894,180 A      4/1999 Volz et al.
7,703,862 B2 *    4/2010 Abe ..................... G01L 19/0645
303/119.3
(Continued)

FOREIGN PATENT DOCUMENTS

DE      112019002771 T5      2/2021
JP      S62290342 A      12/1987
(Continued)

OTHER PUBLICATIONS

International Search Report for PCT/EP2022/072217, Issued Nov. 25, 2022.

*Primary Examiner* — Jas A Sanghera
(74) *Attorney, Agent, or Firm* — NORTON ROSE FULBRIGHT US LLP

(57) ABSTRACT

A sensor device for detecting a rotational position of a rotor of an electric machine. The sensor device has at least one sensor element and at least one electronic component connected electrically to the sensor element. The sensor element and the electronic component are disposed on one common printed circuit board of the sensor device. The printed circuit board has at least a first rigid board part, a second rigid board part, and a flexible board part. The second rigid board part is joined to the first rigid board part by the flexible board (Continued)

part. The sensor element is disposed on the first rigid board part, and the electronic component is disposed on the second rigid board part.

11 Claims, 5 Drawing Sheets

(51) Int. Cl.
   B60T 17/22          (2006.01)
   H02K 11/21          (2016.01)

(56)                    References Cited

U.S. PATENT DOCUMENTS

| | | | |
|---|---|---|---|
| 2004/0108779 A1* | 6/2004 | Boettger | H02K 7/083 |
| | | | 310/43 |
| 2017/0019001 A1 | 1/2017 | Budaker et al. | |
| 2019/0250012 A1* | 8/2019 | Thaler | G01D 5/3473 |
| 2020/0321839 A1 | 10/2020 | Tateyama et al. | |
| 2022/0333959 A1* | 10/2022 | Loeken | G01D 5/145 |

FOREIGN PATENT DOCUMENTS

| | | |
|---|---|---|
| JP | H09266655 A | 10/1997 |
| JP | 2007028811 A | 2/2007 |
| JP | 2008241639 A | 10/2008 |
| JP | 2009261122 A | 11/2009 |
| JP | 4801713 B2 | 10/2011 |
| JP | 2016512948 A | 5/2016 |
| JP | 2020099123 A | 6/2020 |
| TW | 201106580 A | 2/2011 |

* cited by examiner

SENSOR DEVICE FOR DETECTING A ROTATIONAL POSITION OF A ROTOR OF AN ELECTRIC MACHINE, DRIVE DEVICE, PRESSURE GENERATOR FOR A BRAKE SYSTEM

FIELD

The present invention relates to a sensor device for detecting a rotational position of a rotor of an electric machine, having at least one sensor element, and having at least one electronic component connected electrically to the sensor element, the sensor element, and the electronic component being disposed on one common printed circuit board of the sensor device.

In addition, the present invention relates to a drive device having such a sensor device.

The present invention also relates to a pressure generator for a brake system.

BACKGROUND INFORMATION

Drive devices and sensor devices of the general kind indicated at the outset are described in the related art. In the case of a drive device having an electric machine, the electric machine is typically disposed in a housing of the drive device. In that case, the machine as a rule has a rotationally mounted rotor and a stator fixed to the housing and having a motor winding. The motor winding is distributed around the rotor in such a way that the rotor is rotatable by suitable energizing of the motor winding. Typically, the motor winding is polyphase. For example, the motor winding has three phases. In that context, it is conventional to detect a rotational position of the rotor with the aid of a sensor device that has at least one sensor element and at least one electronic component connected electrically to the sensor element. Often, the sensor element and the electronic component are placed on one common printed circuit board of the sensor device. For example, the sensor device is an inductive sensor, so that the sensor element then has at least one receiver coil formed on the printed circuit board. The electronic component is preferably an application-specific integrated circuit (ASIC).

SUMMARY

In a drive device according to an example embodiment of the present invention, the printed circuit board has at least a first rigid board part, a second rigid board part, and a flexible board part, the second rigid board part being joined to the first rigid board part by the flexible board part, the sensor element being disposed on the first rigid board part, and the electronic component being disposed on the second rigid board part. Because the first and the second rigid board parts are joined to each other by the flexible board part, the alignment of the first and the second rigid board parts relative to each other is changeable by deforming the flexible board part. The second rigid board part is thus hinged to the first rigid board part by the flexible board part. This yields advantages in terms of the integration of the printed circuit board or the sensor device into a housing in which the electric machine is located. Specifically, compared to a completely rigid printed circuit board on which both the sensor element and the electronic component are disposed, a two-dimensional design space is expanded by a third dimension. Compared to a sensor device having multiple printed circuit boards electrically interconnected by cable, the design approach of the present invention offers the advantage that the number of components and thus the manufacturing costs are reduced. Printed circuit boards having at least one rigid board part and at least one flexible board part are available in principle in the related art and are also referred to as "Starrflex printed circuit boards". For example, given a completely rigid printed circuit board, a Starrflex printed circuit board may be produced by removing a material, e.g., FR4 causing the rigid form of the printed circuit board, in one area of the printed circuit board, and covering the conductor tracks remaining in this area with a lamination, in order to obtain the flexible board part. Preferably, the sensor element is connected electrically to the electronic component by at least one conductor track which extends through the first rigid board part, the second rigid board part and the flexible board part. Accordingly, the first rigid board part, the second rigid board part and the flexible board part are permanently joined to each other at least in so far as these board parts cannot be separated from each other without damaging the conductor track.

According to one preferred specific embodiment of the present invention, the first rigid board part is annular-disk-shaped. This permits a space-saving integration of the first board part or the sensor device into the housing. Preferably, the flexible board part is situated at a radially outer edge of the annular disk shape of the first rigid board part. This is also advantageous in terms of the space-saving integration of the printed circuit board into the housing. The second rigid board part is preferably rectangular.

According to one preferred specific embodiment of the present invention, the sensor element and the electronic component are disposed on different faces of the printed circuit board. The placement of the sensor element and the electronic component on different faces of the printed circuit board also offers advantages with respect to the integration of the printed circuit board or the sensor device into the housing, as explained below.

According to one preferred specific embodiment of the present invention, the printed circuit board has a third rigid board part and a further flexible board part, the third rigid board part being joined to the second rigid board part by the further flexible board part, and a connection device for the electrical connection of the sensor device to a control unit being disposed on the third rigid board part. The third rigid board part is thus joined to the first rigid board part by the further flexible board part, the second rigid board part and the flexible board part, in that order. The provision of the third rigid board part and the placement of the connection device on the third rigid board part further increases the flexibility with respect to the integration of the printed circuit board or the sensor device into the housing. In addition, forces acting on the connection device are not transferred directly to the second rigid board part, but rather are damped with the aid of the further flexible board part. Preferably, the electronic component is connected electrically to the connection device by at least one conductor track which extends through the second rigid board part, the third rigid board part and the further flexible board part. Accordingly, the second rigid board part, the third rigid board part and the further flexible board part are permanently joined to each other at least in so far as these board parts cannot be separated from each other without damaging the conductor track. According to an alternative specific embodiment, the further flexible board part and the third rigid board part are preferably omitted. In this specific embodiment, the connection device is disposed preferably on the second rigid board part.

According to one preferred specific embodiment of the present invention, the connection device has at least one electroconductive connector having a first contact section and a second contact section, the first contact section being pressed into a press-fit opening of the third rigid board part, and the second contact section being connected or connectable electrically to the control unit. The first contact section thus takes the form of a press-in section. By pressing the first contact section into the press-fit opening of the third rigid board part, a mechanically robust electric connection is provided on the printed circuit board side between the printed circuit board and the connector. The second contact section is preferably in the form of a plug-in section. A mechanically robust connection to the control unit may then be produced in an easy manner, namely, by plugging the second contact section in the form of the plug-in section into a plug socket on the control-unit side. The connector is realized preferably as a punched contact part. The connection device preferably has multiple electroconductive connectors.

According to an example embodiment of the present invention, the connector is preferably angled. The connector thus has a first limb and a second limb which is angled relative to the first limb. The first limb preferably has the first contact section and the second limb has the second contact section. The connector is angled preferably by 80° to 100°, especially preferred by approximately 90°.

The drive device according to an example embodiment of the present invention has an electric machine that is disposed in a housing and has a rotationally mounted rotor as well as a sensor device, fixed to the housing, for detecting a rotational position of the rotor. The drive device includes the sensor device according to the present invention. This also yields the advantages already cited. Further preferred features and feature combinations are derived from the disclosure herein. Preferably, the rotor is disposed in rotatably fixed manner on a drive shaft that is rotationally mounted in the housing. By preference, at least the printed circuit board of the sensor device is situated in the housing.

According to one preferred specific embodiment of the present invention, the drive device has an end shield, and the printed circuit board of the sensor device is secured to the end shield. The end shield is a housing cover covering the electric machine. Typically, the drive shaft of the drive device is rotationally mounted using the end shield. To that end, preferably the end shield bears a pivot bearing that acts between the drive shaft and the end shield. By securing the printed circuit board to the end shield, first of all, a mechanically robust securing of the printed circuit board may be achieved. In addition, a space-saving integration of the printed circuit board into the housing may be achieved. Especially preferred, to that end, the first rigid board part is annular-disk-shaped and is disposed coaxially relative to the drive shaft.

According to one preferred specific embodiment of the present invention, the end shield is produced from a metal material and the printed circuit board is affixed to the end shield by the use of a support element produced from a plastic material. The printed circuit board is thus affixed to the end shield with the aid of the support element. For example, the printed circuit board is secured to the support element by a first bonded connection, and the support element is secured to the end shield by a second bonded connection. If the end shield is produced from the metal material, then the end shield is particularly robust mechanically. Due to the support element, the sensor element is set apart from the metallic end shield, and current-carrying lines or printed conductors of the printed circuit board are electrically insulated from the metallic end shield. Preferably, at least the first rigid board part is secured directly to the support element.

According to an alternative specific embodiment of the present invention, preferably the end shield is produced from a plastic material, and the printed circuit board is affixed directly to the end shield. As a result, the number of components may be reduced compared to the specific embodiment above. In particular, a support element bearing the printed circuit board is omitted. Preferably, the printed circuit board is joined directly to the end shield by a bonded connection. Thus, an adhesive layer is provided which is in touch contact with the end shield on one side and the printed circuit board on the other side. Preferably, the printed circuit board is joined directly to the end shield by at least one fixing means. Thus, at least one fixing means is provided, which is in touch contact both with the end shield and with the printed circuit board. Preferably, the printed circuit board is secured directly to the end shield by a detent connection. To that end, for example, the printed circuit board grabs behind a retaining projection of the end shield. Preferably, at least the first rigid board part is affixed directly to the end shield.

According to one preferred specific embodiment of the present invention, the first rigid board part is aligned perpendicular to the axis of rotation of the rotor, and the second rigid board part is aligned parallel to the axis of rotation of the rotor. The first and the second rigid board parts are thus aligned perpendicular to each other. Due to such an alignment of the first and the second rigid board parts, the space required by the printed circuit board in the radial direction may be reduced. As mentioned before, preferably the sensor element and the electronic component are disposed on different faces of the printed circuit board. Given a perpendicular alignment of the first and the second rigid board parts relative to each other, on one side, the sensor element is facing the rotor, and on the other side, the electronic component is situated radially within the second rigid board part. The electronic component is then shielded by the second rigid board part against electroconductive motor-phase leads located radially outside of the second rigid board part. The second and the third rigid board parts are preferably angled relative to each other. For example, the angle between the second and the third rigid board parts is 15° to 30°, especially preferred, 20°. If the end shield is produced from a plastic material, then the end shield preferably has at least one retaining structure by which the second rigid board part and/or the third rigid board part is/are affixed with form locking to the end shield. If the end shield is produced from a metal material, then the support element preferably has at least one retaining structure by which the second rigid board part and/or the third rigid board part is/are affixed with form locking to the support element. Such retaining structures ensure that the desired alignment of the first and second rigid board parts relative to each other is maintained.

According to one preferred specific embodiment of the present invention, the end shield has at least one axial through-hole, and at least the second contact section of the connector projects through the axial through-hole. The second contact section of the connector is thus disposed at least sectionally on a different side of the end shield than the printed circuit board. The accessibility of the second contact section is thereby improved, thus facilitating the connection of the control unit to the connection device.

According to an example embodiment of the present invention, the drive device preferably has a plug guide, made of a plastic material, which is disposed on the end shield and radially surrounds the second contact section of the connector at least in some areas. The plug guide is able to facilitate the fitting together of the second contact section of the connector, with the plug socket on the control unit side. For example, to that end, a contact element bearing the plug socket is adapted in shape to the plug guide in such a way that the contact element is insertable without play into the plug guide. The plug guide is preferably sleeve-like or formed as a guide sleeve. If the end shield is made of a plastic material, then preferably the plug guide is formed integrally with the end shield. If the end shield is produced from a metal material, then preferably the plug guide is formed separately from the end shield and attached to the end shield. For instance, the plug guide is then inserted into the axial through-hole of the end shield and secured to the end shield by a detent connection.

The pressure generator according to an example embodiment of the present invention for a brake system has a pump device and a drive device for actuating the pump device. The pressure generator includes the drive device according to the present invention. This also yields the advantages described above. Further preferred features and feature combinations are derived from the disclosure herein.

In the following, the present invention is explained in greater detail with the aid of the figures.

DETAILED DESCRIPTION EXAMPLE EMBODIMENTS

Figure 1:
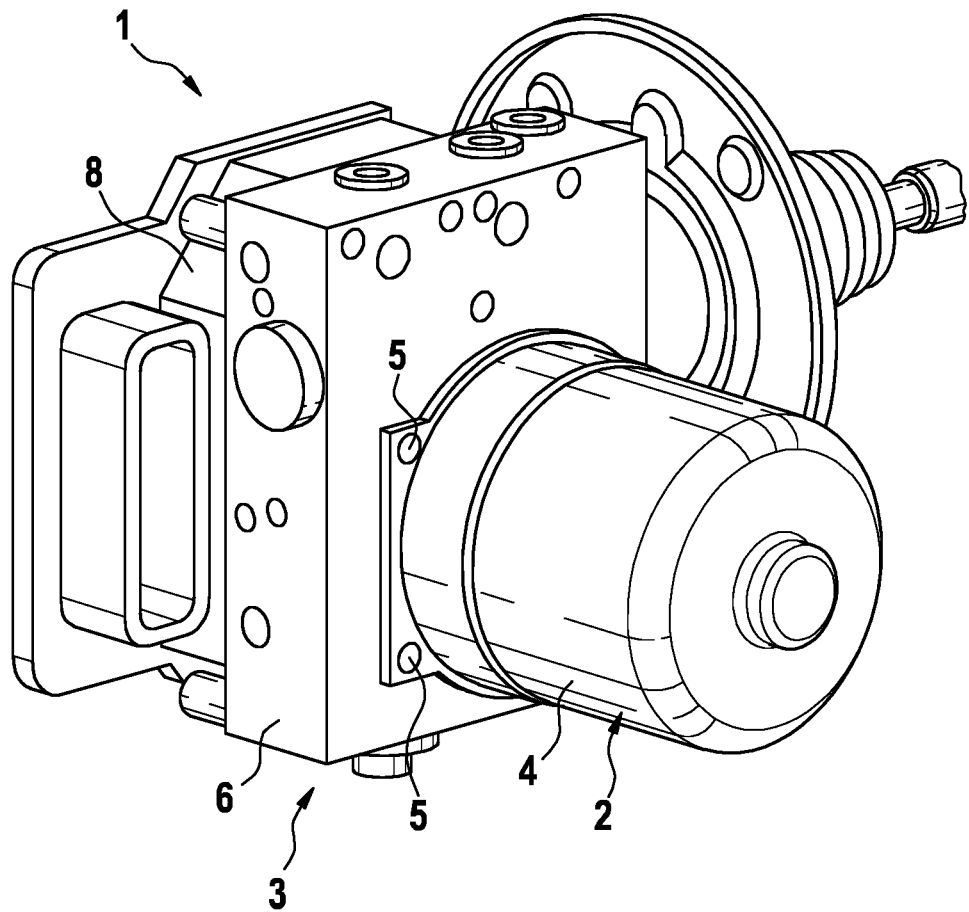
FIG. 1 shows a perspective representation of a pressure generator for a brake system, according to an example embodiment of the present invention.

FIG. 1 shows a simplified representation of a pressure generator 1 for a hydraulic brake system of a motor vehicle. Pressure generator 1 has an electric drive device 2 and a pump device 3 having at least one fluid pump. A housing 4 of drive device 2 is fastened to a housing 6 of pump device 3 by multiple fastening means 5. Housing 4 in the present case is cup-shaped. Drive device 2 is designed to actuate the fluid pump of pump device 3. To that end, drive device 2 has an electric machine 7 that is located in housing 4 and therefore cannot be seen in FIG. 1. In addition, pressure generator 1 has a control unit 8 for controlling machine 7. Pump device 3 is disposed between drive device 2 on one side and control unit 8 on the other side.

Figure 2:
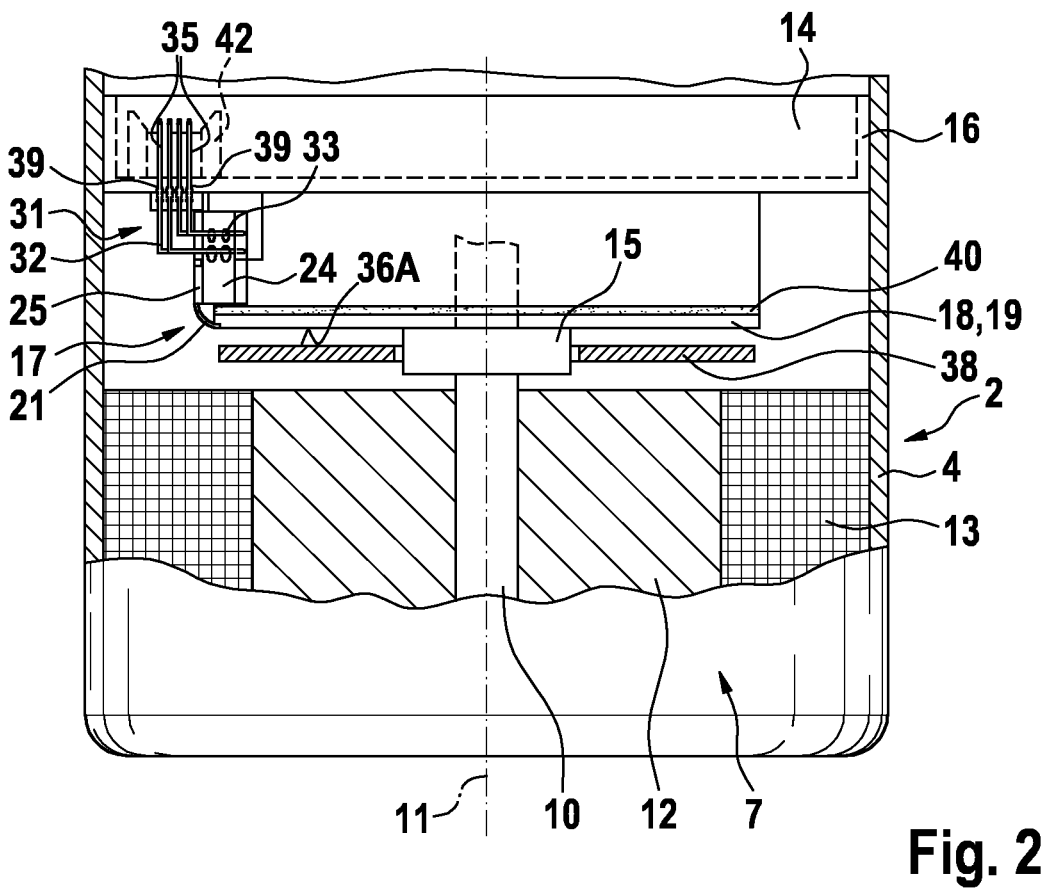
FIG. 2 shows a drive device of the pressure generator according to an example embodiment of the present invention.

FIG. 2 shows a sectional view of drive device 2. As can be seen from FIG. 2, drive device 2 has a drive shaft 10 which is mounted in housing 4 of drive device 2 in a manner allowing rotation about an axis of rotation 11. Drive shaft 10 is operatively connected to the fluid pump of pump device 3 by a gear device, not shown for reasons of clarity. The gear device is preferably a planetary gear, a sun wheel of the planetary gear being disposed in rotatably fixed manner on drive shaft 10.

Electric machine 7 has a rotor 12 disposed in rotatably fixed manner on drive shaft 10. The axis of rotation of rotor 12 corresponds to axis of rotation 11 of drive shaft 10. In addition, electric machine 7 has a stator 13 fixed to the housing 4. Stator 13 has a polyphase motor winding, not shown for reasons of clarity, which is distributed around rotor 12 in such a way that rotor 12, and thus drive shaft 10, is rotatable or able to be driven by suitable energizing of the motor winding.

In addition, drive device 2 has an end shield 14 fixed to the housing. According to the exemplary embodiment shown in FIG. 2, end shield 14 is produced from a plastic material. End shield 14 covers electric machine 7 and thus forms a kind of housing cover of housing 4. End shield 14 is designed for the suspension of drive shaft 10. To that end, end shield 14 has a sleeve-like bearing section 15 extending in the axial direction. Situated between bearing section 15 and drive shaft 10 is preferably a pivot bearing, not visible, which is a rolling-element bearing, for example. In addition, end shield 14 has a sleeve-like fastening section 16 extending in the axial direction. End shield 14 is secured to housing 4 by fastening section 16, e.g., by a frictional connection, by a bonded connection or by at least one fastening means.

Figure 3:
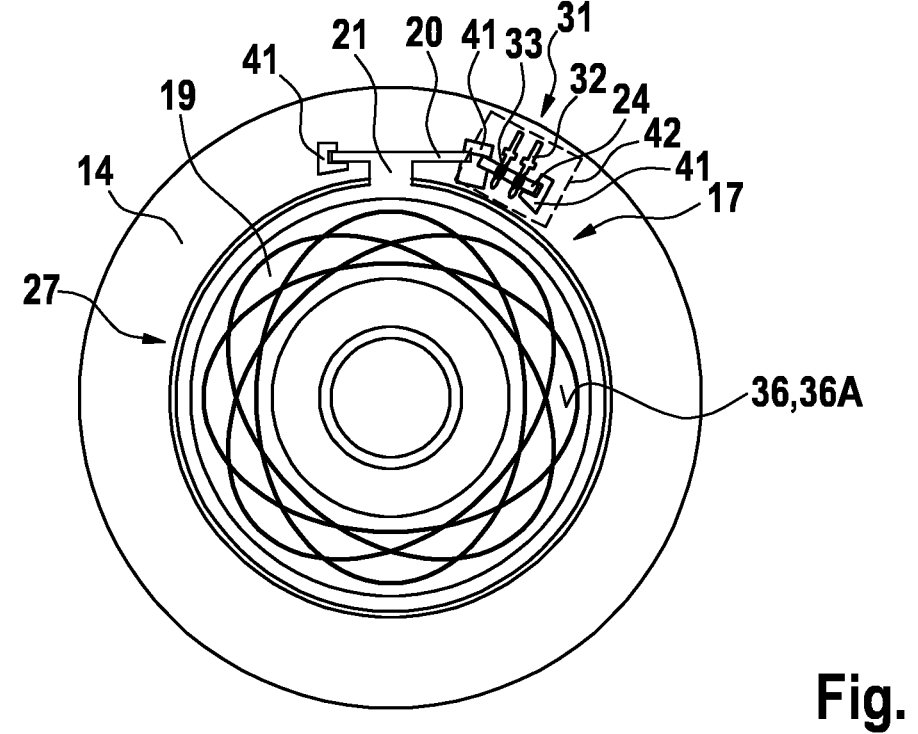
FIG. 3 shows an end shield and a sensor device of the drive device, according to an example embodiment of the present invention.
Figure 4A:
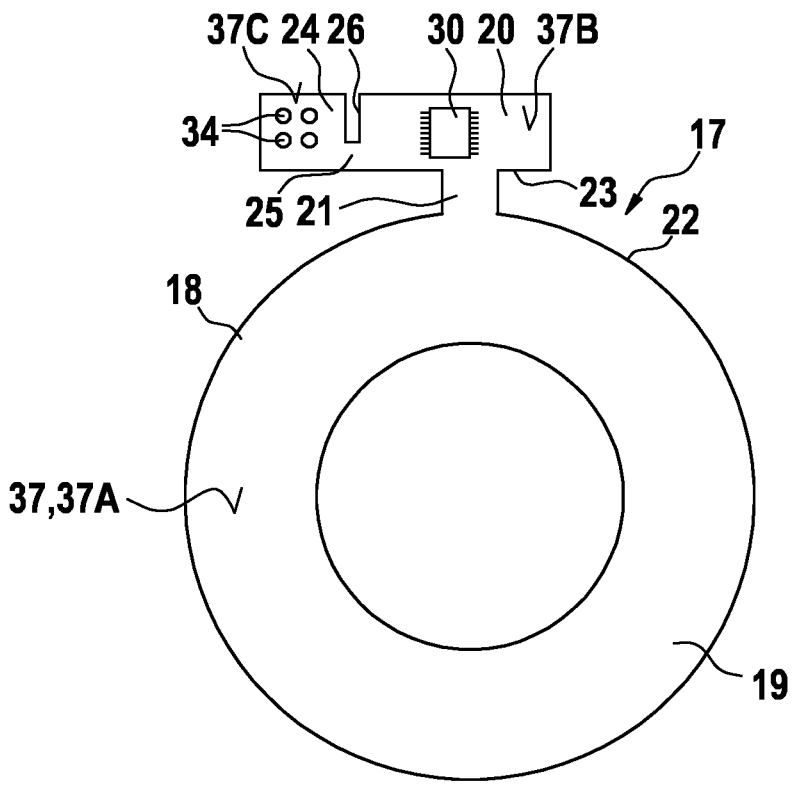
FIG. 4A shows a back view of the sensor device, according to an example embodiment of the present invention.
Figure 4B:
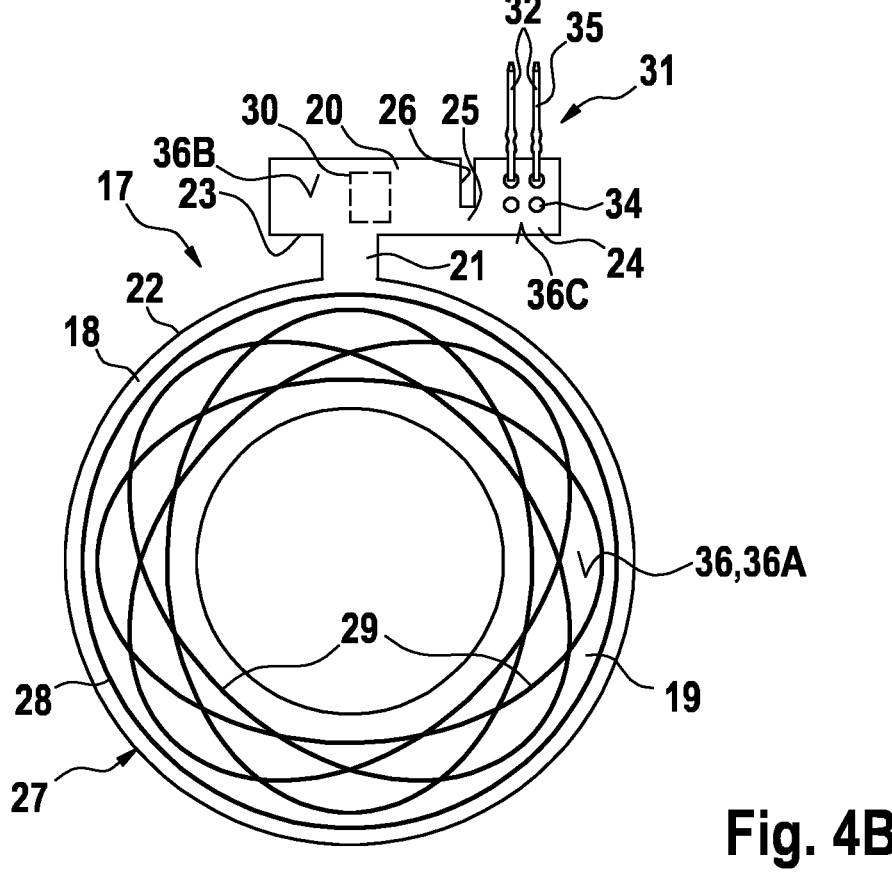
FIG. 4B shows a front view of the sensor device according to an example embodiment of the present invention.

In addition, drive device 2 has a sensor device 17 fixed to the housing, which is designed to detect a rotational position of rotor 12. Sensor device 17 is affixed to end shield 14. The form of sensor device 17 is explained in greater detail hereinafter with reference to FIGS. 2, 3, 4A and 4B. For this, FIG. 3 shows a further representation of sensor device 17 secured to end shield 14. FIG. 4A shows a back view of sensor device 17 without end shield 14. FIG. 4B shows a front view of sensor device 17 without end shield 14.

Sensor device 17 has a printed circuit board 18 in the form of Starrflex printed circuit board 18. Printed circuit board 18 has a first rigid board part 19. As may be seen from the figures, first rigid board part 19 is annular-disk-shaped. In addition, printed circuit board 18 has a second rigid board part 20. In the present case, second rigid board part 20 is rectangular. Second rigid board part 20 is joined to first rigid board part 19 by a flexible board part 21. Second rigid board part 20 is thus hinged to first rigid board part 19, so that the alignment of first rigid board part 19 and second rigid board part 20 relative to each other is changeable by a deformation of flexible board part 21. As recognizable from the figures, flexible board part 21 is located at a radially outer edge 22 of the annular disk shape of first rigid board part 19. In addition, flexible board part 21 is located at a first edge 23 of second rigid board part 20. Moreover, printed circuit board 18 has a third rigid board part 24. Third rigid board part 24 is joined to second rigid board part 20 by a further flexible board part 25. Third rigid board part 24 is thus hinged to second rigid board part 20, so that the alignment of second rigid board part 20 and third rigid board part 24 relative to each other is changeable by a deformation of further flexible board part 25. As discernible from FIGS. 4A and 4B, third rigid board part 24 in the present case is rectangular. Further flexible board part 25 is located at a second edge 26, aligned perpendicular to first edge 23, of second rigid board part 20.

Sensor device 17 has a sensor element 27 which is disposed on first rigid board part 19. In the present case, sensor device 17 is in the form of inductive sensor 17. To that end, sensor element 27 in the present case has one transmitter coil 28 and two receiver coils 29, coils 28 and 29 being formed as conductor tracks on first rigid board part 19.

In addition, sensor device 17 has an electronic component 30 which is disposed on second rigid board part 20. In the present case, electronic component 30 is an application-specific integrated circuit (ASIC). Electronic component 30 is connected electrically to sensor element 27 and is designed to demodulate or to process the sensor signal of sensor element 27.

Sensor device 17 also has a connection device 31 for the electrical connection of sensor device 17 to control unit 8. In the present case, connection device 31 is disposed on third rigid board part 24. Connection device 31 is connected electrically to electronic component 30. Connection device 31 has multiple electroconductive connectors 32. In the present case, four electroconductive connectors 32 are provided, in the case of sensor device 17 shown in FIG. 4A, connectors 32 not yet being disposed on printed circuit board 18, and in the case of sensor device 17 shown in FIG. 4B, only two connectors 32 being disposed on printed circuit board 18.

Connectors 32 each have a first contact section 33. Each first contact section 33 is pressed into a different press-fit opening 34 of third rigid board part 24. In addition, connectors 32 each have a second contact section 35. Second contact sections 35 are connected or connectable electrically to control unit 8. In the present case, second contact sections 35 are in the form of plug-in sections 35. Plug sockets on the control-unit side may be slipped onto plug-in sections 35 in order to connect sensor device 17 electrically to control unit 8. Connectors 32 in the present case are angled. As may be seen in FIGS. 2 and 3, the angle between first contact sections 33 and second contact sections 35 is 90° in the present case.

Printed circuit board 18 has a first face 36 and a second face 37. First face 36 is denoted hereinafter as front side 36. Second face 37 is denoted hereinafter as back side 37. Front side 36 is formed by a front-side section 36A of first rigid board part 19, a front-side section 36B of second rigid board part 20 and a front-side section 36C of third rigid board part 24. Back side 37 is formed by a back-side section 37A of first rigid board part 19, a back-side section 37B of second rigid board part 20 and a back-side section 37C of third rigid board part 24. If rigid board parts 19, 20 and 24 are aligned parallel to each other as shown in FIGS. 4A and 4B and are disposed at the same level, then front-side sections 36A, 36B and 36C lie in the same plane. However, if rigid board parts 19, 20 and 24 are aligned at an angle relative to each other as in FIGS. 2 and 3, then front-side sections 36A, 36B and 36C are also aligned at an angle relative to each other. The equivalent holds true for back-side sections 37A, 37B and 37C, as well.

Sensor element 27 of sensor device 17 is disposed on front-side section 36A of first rigid board part 19. Electronic component 30 is disposed on back-side section 37B of second rigid board part 20. Sensor element 27 and electronic component 30 are thus situated on different faces of printed circuit board 18.

In the following, the securing of sensor device 17 to end shield 14 is explained in greater detail with reference to FIGS. 2 and 3. If sensor device 17 is secured to end shield 14, then first rigid board part 19 is disposed coaxially relative to drive shaft 10. In this case, front-side section 36A of first rigid board part 19 is facing rotor 12, so that sensor element 27 lies axially opposite rotor 12 or a transducer 38 coupled in rotatably fixed manner to rotor 12. Flexible board part 21 is deformed in such a way that second rigid board part 20 is aligned parallel to axis of rotation 11 of rotor 12 and perpendicular to first rigid board part 19. At the same time, back-side section 37B points radially to the inside, so that electronic component 30 is disposed radially within second rigid board part 20. Further flexible board part 25 is deformed in such a way that the angle between second rigid board part 20 and third rigid board part 24 is approximately 20°. Second contact sections 35 of connectors 32 in each case project through a different axial through-hole 39 of end shield 14. Accordingly, second contact sections 35 are situated at least sectionally on a different side of end shield 14 than printed circuit board 18. Second contact sections 35 are thereby easily accessible for a connection to control unit 8.

According to the exemplary embodiment shown in FIGS. 2 and 3, printed circuit board 18 is secured directly to end shield 14 by a bonded connection. The bonded connection is formed by an adhesive layer 40 that is in touch contact with end shield 14 on one side and first rigid board part 19 on the other side.

As may be seen from FIG. 3, end shield 14 has multiple retaining structures 41 by which second rigid board part 20 and third rigid board part 24 are affixed with form locking to end shield 14. In the present case, retaining structures 41 are formed integrally with end shield 14. Consequently, retaining structures 41 are produced from a plastic material.

As discernible from FIGS. 2 and 3, drive device 2 has a plug guide 42 in the form of a guide sleeve 42 which radially surrounds second contact sections 35 at least in some areas. In the present case, plug guide 42 is formed integrally with end shield 14. Consequently, plug guide 42 is produced from a plastic material.

Figure 5:
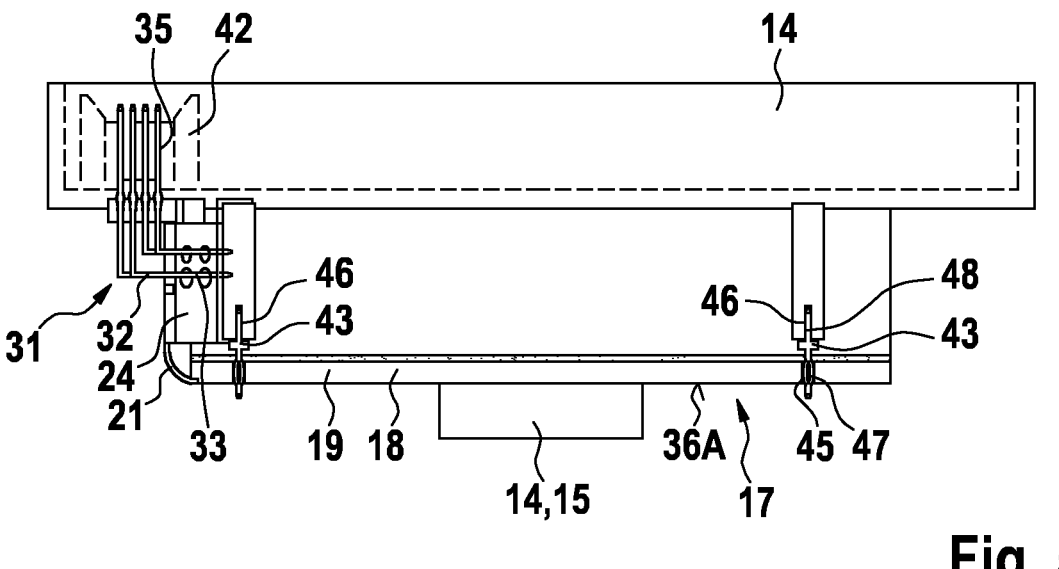
FIG. 5 shows the end shield and the sensor device according to a second exemplary embodiment of the present invention.
Figure 6:
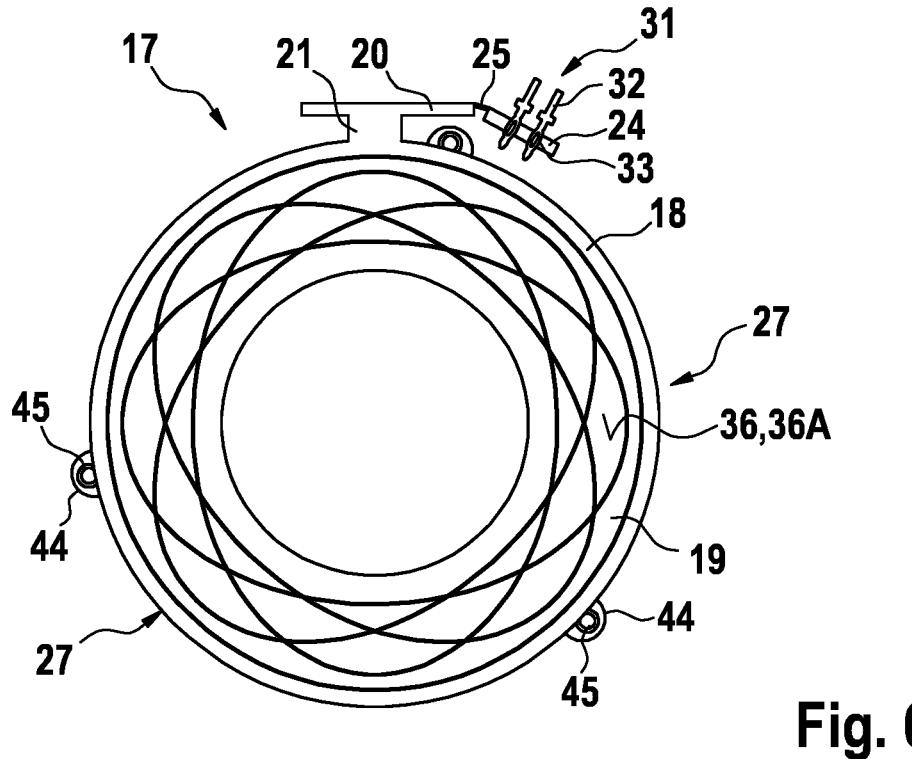
FIG. 6 shows the sensor device according to the second exemplary embodiment of the present invention.

FIG. 5 shows end shield 14 and sensor device 17 according to a second exemplary embodiment. FIG. 6 shows sensor device 17 depicted in FIG. 5, without end shield 14. The second exemplary embodiment shown in FIGS. 5 and 6 differs from the exemplary embodiment shown in FIGS. 2, 3, 4A and 4B essentially with respect to the attachment of sensor device 17 to end shield 14.

According to the second exemplary embodiment shown in FIGS. 5 and 6, sensor device 17 is affixed directly to end shield 14 by multiple fixing means 43. To that end, at its radially outer edge 22, first rigid board part 19 has multiple radial projections 44 having press-fit openings 45. End shield 14 has a number of blind holes 46 corresponding to the number of press-fit openings 45. Fixing means 43 are in the form of press-in pins 43. Each press-in pin 43 has a first end section 47 and a second end section 48. First end sections 47 are each pressed into a different press-fit opening 45. Second end sections 48 are each pressed into a different blind hole 46.

Figure 7:
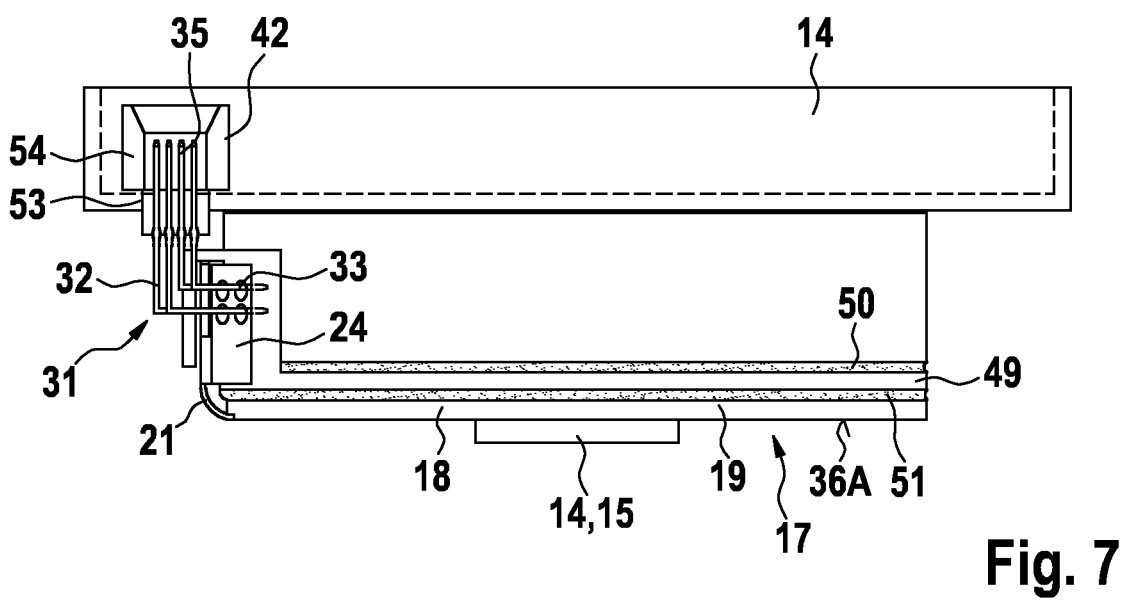
FIG. 7 shows the end shield and the sensor device according to a third exemplary embodiment of the present invention.
Figure 8:
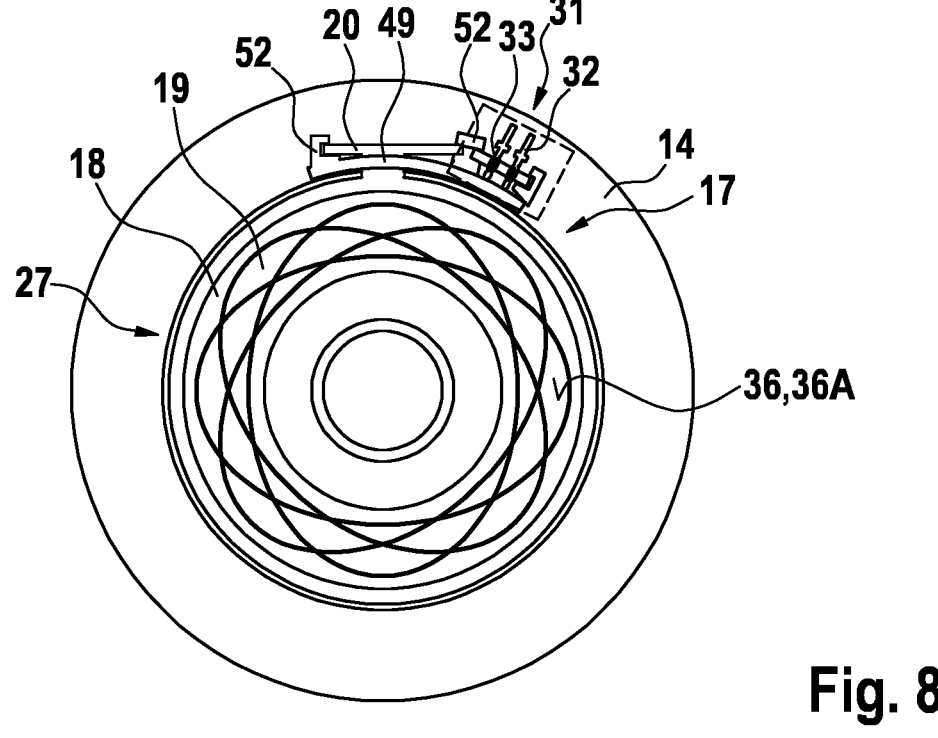
FIG. 8 shows a further view of the end shield and the sensor device according to the third exemplary embodiment of the present invention.

FIGS. 7 and 8 show end shield 14 and sensor device 17 according to a third exemplary embodiment. According to the third exemplary embodiment, end shield 14 is produced from a metal material. Printed circuit board 18 is secured to end shield 14 by the use of a support element 49 made of a plastic material. Support element 49 is situated between end shield 14 and first rigid board part 19. In the present case, support element 49 is secured to end shield 14 by a first bonded connection. To that end, a first adhesive layer 50 is provided that is in touch contact with end shield 14 and support element 49. First rigid board part 19 is secured to support element 49 by a second bonded connection. To that end, a second adhesive layer 51 is provided that is in touch contact with support element 49 and first rigid board part 19.

As may be seen from FIG. 8, support element 49 has multiple retaining structures 52 by which second rigid board part 20 and third rigid board part 24 are affixed with form locking to support element 49. Retaining structures 52 are formed integrally with support element 49, and consequently are produced from a plastic material.

As discernible from FIG. 7, instead of multiple axial through-holes 39, end shield 14 has only one axial through-hole 53, through which second contact sections 35 of connectors 32 project. According to the third exemplary embodiment shown in FIGS. 7 and 8, plug guide 42 is part of a component 54, made from a plastic material, which is inserted into axial through-hole 53 and secured to end shield 14 by a detent connection.

What is claimed is:

1. A sensor device for detecting a rotational position of a rotor of an electric machine, the sensor device comprising:
   at least one sensor element; and
   at least one electronic component connected electrically to the sensor element, the sensor element and the electronic component being disposed on one common printed circuit board of the sensor device;
   wherein the printed circuit board has at least a first rigid board part, a second rigid board part, and a flexible board part, the second rigid board part being joined to the first rigid board part by the flexible board part, the sensor element being disposed on the first rigid board part and the electronic component being disposed on the second rigid board part,
   wherein the printed circuit board has a third rigid board part, and a further flexible board part, the third rigid board part being joined to the second rigid board part by the further flexible board part, and a connection device for the electrical connection of the sensor device to a control unit being disposed on the third rigid board part.

2. The sensor device as recited in claim 1, wherein the first rigid board part is annular-disk-shaped.

3. The sensor device as recited in claim 1, wherein the sensor element and the electronic component are disposed on different faces of the printed circuit board.

4. The sensor device as recited in claim 1, wherein the connection device has at least one electroconductive connector having a first contact section and a second contact section, the first contact section being pressed into a press-fit opening of the third rigid board part, and the second contact section being connected or connectable electrically to the control unit.

5. The sensor device as recited in claim 4, wherein the connector is angled.

6. A drive device, comprising:
   an electric machine, disposed in a housing and having a rotationally mounted rotor and a sensor device, fixed to the housing, configured to detect a rotational position of the rotor;
   wherein the sensor device includes:
   at least one sensor element, and
   at least one electronic component connected electrically to the sensor element, the sensor element and the electronic component being disposed on one common printed circuit board of the sensor device,
   wherein the printed circuit board has at least a first rigid board part, a second rigid board part, and a flexible board part, the second rigid board part being joined to the first rigid board part by the flexible board part, the sensor element being disposed on the first rigid board part and the electronic component being disposed on the second rigid board part,
   wherein the drive device has an end shield, and the printed circuit board of the sensor device is secured to the end shield,
   wherein the printed circuit board includes a connector having a first contact section and a second contact section, the connector being configured for the electrical connection of the sensor device to a control unit, wherein the end shield has at least one axial through-hole, and at least the second contact section of the connector projects through the axial through-hole.

7. The drive device as recited in claim 6, wherein the end shield is produced from a metal material, and the printed circuit board is secured to the end shield by use of a support element produced from a plastic material.

8. The drive device as recited in claim 6, wherein the end shield is produced from a plastic material, and the printed circuit board is secured directly to the end shield.

9. The drive device as recited in claim 6, wherein the first rigid board part is aligned perpendicular to an axis of rotation of the rotor, and the second rigid board part is aligned parallel to the axis of rotation of the rotor.

10. The drive device as recited in claim 6, further comprising a plug guide, made of a plastic material, which is disposed on the end shield and radially surrounds the second contact section of the connector at least in some areas.

11. A pressure generator for a brake system, comprising:
   a pump device; and
   a drive device configured to actuate the pump device, the drive device including
   an electric machine, disposed in a housing and having a rotationally mounted rotor and a sensor device, fixed to the housing, configured to detect a rotational position of the rotor;
   wherein the sensor device includes:
   at least one sensor element, and
   at least one electronic component connected electrically to the sensor element, the sensor element and the electronic component being disposed on one common printed circuit board of the sensor device,
   wherein the printed circuit board has at least a first rigid board part, a second rigid board part, and a flexible board part, the second rigid board part being joined to the first rigid board part by the flexible board part, the sensor element being disposed on the first rigid board part and the electronic component being disposed on the second rigid board part,
   wherein the printed circuit board has a third rigid board part, and a further flexible board part, the third rigid board part being joined to the second rigid board part by the further flexible board part, and a connection device for the electrical connection of the sensor device to a control unit being disposed on the third rigid board part.

* * * * *